Jan. 27, 1970          G. L. SILVER          3,492,160

SELF REGENERATING STORAGE BATTERY

Filed March 27, 1968

Gary L. Silver
INVENTOR.

BY

United States Patent Office 3,492,160
Patented Jan. 27, 1970

3,492,160
SELF REGENERATING STORAGE BATTERY
Gary L. Silver, Centerville, Ohio, assignor to the United States of America as represented by the United States Atomic Energy Commission
Filed Mar. 27, 1968, Ser. No. 716,436
Int. Cl. H01m 35/02, 35/12
U.S. Cl. 136—6                                   5 Claims

ABSTRACT OF THE DISCLOSURE

A radioactive voltaic battery which is self recharging comprising an anodic cell having low valence plutonium ions for oxidation dissolved in an acid solution, a cathodic cell having plutonium ions of a higher valence for reduction dissolved in a more concentrated acid solution, and means for providing ion migration between said anodic and cathodic cells. On open circuit conditions the anodic cell regenerates the low valence plutonium ions and the cathodic cell regenerates plutonium ions having the higher valence.

BACKGROUND OF INVENTION

With the advent of travel to, and installations within, remote regions either in outer space or on earth, there arises a need for electric generators or batteries which, even though operated only intermittently, may last for long periods without servicing, recharging or replacing. For instance, emergency power for lighting or radio transmitters at remote locations may require long life, minimum maintenance power sources. Likewise, photographic and transmission equipment left on satellites, alien planets, or at remote terrestrial locations may require intermittent power supplied over long periods of time.

Conventional electrochemical storage batteries having voltaic or galvanic cells may provide power for a limited period of time, but must subsequently be replaced or recharged. Hence, such batteries are generally restricted to use in locations which are accessible for periodic inspection and servicing.

Various nuclear power sources, such as thermionic conversion units and radioactive batteries which collect charged particles emitted from a radiation source, have provided long life electric power sources for use in not readily accessible locations. These units may be energized by radioactive sources, either to provide heat or to emit charged particles, and therefore may require special handling and consequently be difficult to assemble and make ready for use.

SUMMARY OF INVENTION

It is therefore an object of this invention to provide a self recharging electrochemical battery.

It is a further object to provide a plutonium valence battery which is self regenerating.

Various other objects and advantages will become apparent from the following description and embodiments of the invention.

As shown the invention comprises a self recharging storage battery having a cathode submerged in a first acid solution containing plutonium ions, an anode submerged in a second less concentrated acid solution containing plutonium ions, and a means for providing ion migration between the solutions. Plutonium ions are oxidized at the anode and reduced at the cathode when the battery is providing power to a load, and are restored to their original valence species when the battery is disconnected from the load circuit.

DESCRIPTION OF DRAWINGS

The present invention is illustrated in the following drawings wherein.

DETAILED DESCRIPTION

Figure 1:
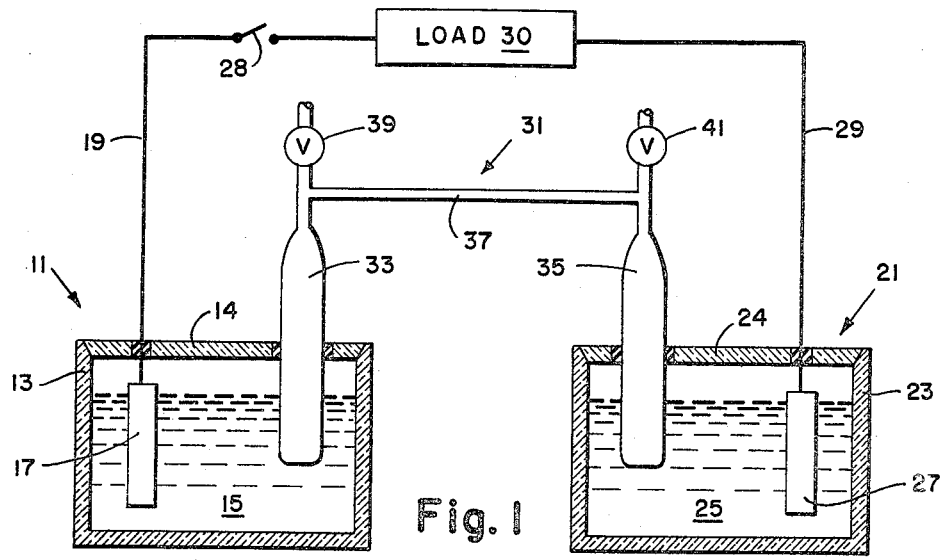
FIG. 1 is a more or less schematic diagram partly in cross section of a self recharging battery.

One form of the self regenerating electrochemical or voltaic storage battery is illustrated in FIG. 1. A cathodic cell 11 may include a suitable container 13 such as a glass beaker or jar equipped with a lid or closure 14 which may be threadedly or otherwise suitably attached to container 13. A first nitric or hydrochloric acid solution 15 having a concentration of about one mole per liter may be disposed in container 13 and may include plutonium ions at a suitable concentration such as about somewhat greater than zero to three grams per liter. Plutonium ion concentrations up to about 50 grams per liter, limited by solubility or radioactive heat dissipation may be used. Submerged in solution 15 may be a cathode 17 formed from a metal plate or foil, such as platinum, gold, etc. connected to a suitable electrical conductor or lead 19 which penetrates the closure 14 in fluid-tight manner. An anodic cell 21, shown spaced from the cathodic cell 11, may include a suitable glass or other material container 23, with closure 24, holding a second nitric or hydrochloric acid solution 25 which may be less concentrated than the first acid solution 15. The second acid solution may also contain about two or three grams per liter of plutonium ions. Submerged in the second nitric acid solution may be an anode 27 which may also be composed of a metal foil or plate such as platinum, gold, etc. and be equipped with a suitable electrical conductor 29, extending in fluid-tight manner through closure 24 that engages container 23 similarly to closure 14 and container 13. Conductor 29 and conductor 19 may be connected through switch 28 to an electrical load 30. A salt bridge 31 may provide electrical continuity and a means for providing ion migration between the acid solutions 15 and 25 during current flow and recharging. The salt bridge may maintain electrical neutrality among the ions in solutions to facilitate a potential difference between the cathode and anode. The salt bridge may include typical and commercially available salt bridge tubes 33 and 35 such as a calomel element for a pH meter which may penetrate, in fluid-tight manner, respective closures 14 and 24 to contact solutions 15 and 25 and may be interconnected by glass or other suitable tubing 37. The tubing 33, 35, and 37 may be filled with a suitable electrolytic salt solution such as saturated potassium nitrate through valves or cocks 39 and 41, and if provided in the conventional form with atmospheric pinhole vents such are preferably closed or sealed to obviate escape of solution.

The storage battery, as shown, may operate as a pair of plutonium valence voltaic half-cells. The cathodic cell 11 may have a relatively large concentration of plutonium tetravalent ions in relation to plutonium trivalent ions, and discharge according to the reduction reaction:

$$Pu(IV) + e = Pu(III) \tag{1}$$

As the above reaction proceeds the nitric acid solution 15 becomes more concentrated in plutonium trivalent ions such that the rate of reaction tends to diminish and eventually reaches equilibrium corresponding to a dead or discharged battery.

The anodic cell 21 may have in acid solution 25 a relatively large concentration of plutonium trivalent ions in relation to the plutonium tetravalent ions and may discharge according to the oxidation reaction:

$$Pu(III) = Pu(IV) + e \qquad (2)$$

The rate of reaction may decrease in a manner similar to that occurring in the cathodic cell as the reaction product, plutonium tetravalent ions, increases and the battery becomes discharged.

The theoretical voltage or electromotive force which may be applied to electrical load 30 from leads 19 and 29 may be approximated by the following equation:

$$E = 60 \log \left(\frac{Pu(IV)}{Pu(III)}\right)_{cathode} \left(\frac{Pu(III)}{Pu(IV)}\right)_{anode} \qquad (3)$$

where:

E is the voltage in millivolts.
Pu(IV) is moles per liter of plutonium tetravalent ions.
Pu(III) is moles per liter of plutonium trivalent ions.

It will be clear that for E to have a value other than zero, that is for the battery to have a theoretical voltage between the anode and cathode, the proportion of plutonium tetravalent ions and trivalent ions in the cathodic cell and in the anodic cell must not be equal. However, since Equation 3 is theoretical and does not account for resistance losses or junction potentials within the cells, the plutonium concentration ratios for each cell should be substantially different to produce a voltage output. It will accordingly be seen from Equations 1, 2, and 3 that after the battery supplies current for a period of time it tends to reach a condition of equilibrium where its output voltage becomes zero and will thereafter need recharging or regeneration prior to additional use.

It has been found that when plutonium ions are dissolved in nitric or other acid that the valence of the ions may change. This phenomena has been observed for both plutonium-238 and for plutonium-239 but the changes are at a much higher rate for plutonium-238 solutions which reach ion valence distribution equilibrium substantially faster than a comparable plutonium-239 solution.

Figure 2:
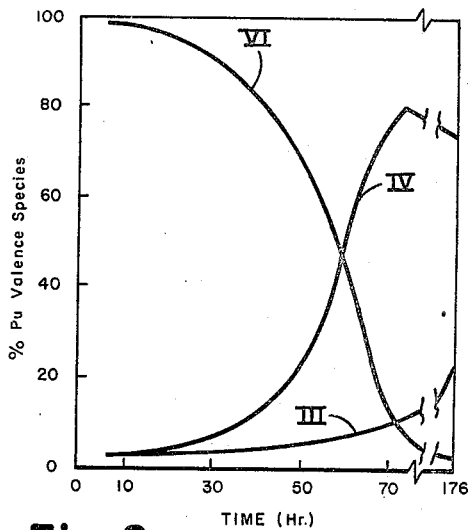
FIG. 2 is a graph showing plutonium ion valence species distribution in a 0.57 molar nitric acid solution as a function of time after preparation.

FIG. 2 shows the changes in valence species as a function of time occurring when plutonium-238 hexavalent ions are dissolved in a 0.57 molar solution of nitric acid. Curve VI corresponds to the concentration of plutonium hexavalent ions which decreased as a function of time while curves III and IV correspond to plutonium trivalent ions and plutoniums tetravalent ions respectively which increased in concentration as a function of time.

Figure 3:
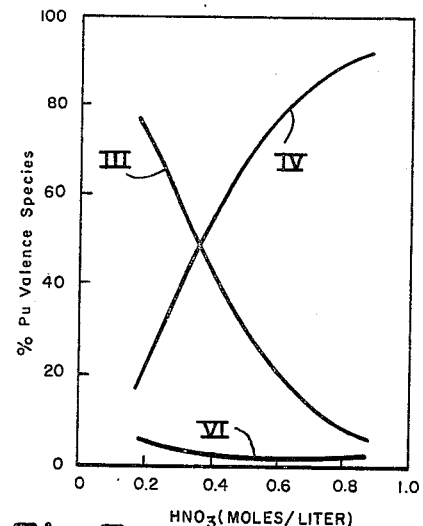
FIG. 3 is a graph showing plutonium ion valence species distribution one week after preparation as a function of nitric acid concentration.

It has also been found that after an acid solution of plutonium-238 ions has come to equilibrium or has remained undisturbed for a period of time, that the relative concentrations of plutonium ion valence species will reach levels dependent on acid concentration. The phenomena is illustrated in FIG. 3, prepared from data collected by analyzing several nitric acid solutions having about two or three grams per liter of 80% plutonium-238 ions one week after preparation. Curve VI represents the original plutonium hexavalent ions which are at a low level for all nitric acid concentrations. Curve IV represents a plutonium tetravalent ions which exceed 90% of the total plutonium ion concentration at about 1 molar nitric acid concentration. Curve III represents plutonium trivalent ions which exceed about 80% of the total plutonium ions in nitric acid concentrations less than about 0.2 mole per liter.

The data presented in FIGS. 2 and 3 show that a self regenerating storage battery similar to that shown in FIG. 1 or an equivalent embodiment can be prepared by filling the cathodic cell 11 with a first nitric or hydrochloric acid-plutonium ion solution having an acid concentration of about one mole per liter to produce a predominance of plutonium tetravalent ions for reduction at the cathode. Higher acid concentrations may also be used. Similarly, the anodic cell may be filled with a second nitric or hydrochloric acid-plutonium ion solution having an acid concentration less than that of the first solution or at about two tenths mole per liter to produce a predominance of plutonium trivalent ions for oxidation at the anode. It has been further found that after use or discharge through a load, shown as load 30 in FIG. 1, and disconnecting the battery by switch 28 therefrom, the idle or disconnected storage battery of the present invention may regenerate plutonium trivalent ions and plutonium tetravalent ions in the anodic and cathodic cells respectively such that self recharging occurs without need for power input from an outside source. The radioactivity of the plutonium may be the driving force or source of regenerated energy or charge.

As an example of various self regenerating storage batteries similar to that shown in FIG. 1 which can be provided, Table 1 lists the voltage output and power dissipation across a 10,000 ohm resistor for varying nitric acid concentrations in the anodic cell and 0.974 molar nitric acid with 2.4 grams per liter of plutonium-238 ions in the cathodic cell.

TABLE 1

| HNO₃ at Anode (moles/l.) | Pu-238 at Anode (mg./ml.) | Open Circuit Voltage (millivolts) | Voltage Across 10K ohm Resistor (millivolts) | Power Dissipation (microwatts) |
|---|---|---|---|---|
| 0.828 | 2.41 | 7 | 3 | 0.0009 |
| 0.754 | 2.31 | 12 | 5 | 0.0025 |
| 0.520 | 2.28 | 23 | 11 | 0.0121 |
| 0.454 | 2.39 | 35 | 16 | 0.0256 |
| 0.228 | 2.33 | 54 | 25 | 0.0625 |
| 0.186 | 2.48 | 65 | 28 | 0.0784 |
| 0.130 | 2.44 | 72 | 34 | 0.1156 |

It can be seen from the table that at a constant nitric acid concentration at the cathode the maximum voltage and power output is obtained from the lowest nitric acid concentration (0.130 molar) at the anode. Increased output may also be obtained with increased acid concentration at the cathode.

Figure 4:
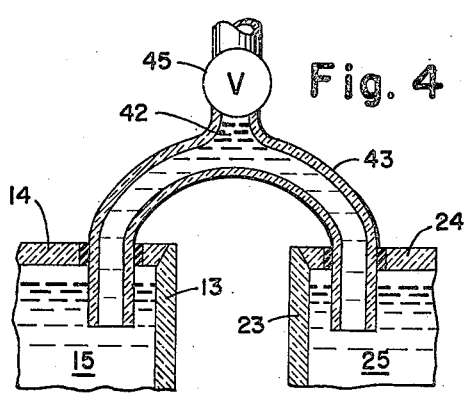
FIG. 4 is a fragmentary view, partially in cross section, of a modification of the self recharging battery of FIG. 1.

FIG. 4 shows a modification of the battery illustrated in FIG. 1, wherein in lieu of the salt bridge 31 there is provided a liquid to liquid junction 42 maintained between the nitric acid solutions 15 and 25. These nitric acid solutions may be vacuum drawn into an interconnecting inverted U or V shaped tube 43 (the legs of which preferably penetrate in fluid-tight manner the closures 14 and 24) having a valved vacuum connection 45 at its apex or highest point to maintain the liquid in the tube. The performance of a self regenerating storage battery having such a liquid junction is shown in Table 2.

TABLE 2

| Anode | Cathode | Open Circuit Voltage (millivolts) | Voltage Across 10K Ohm Resistor (millivolts) | Power Dissipation (microwatts) |
|---|---|---|---|---|
| 0.130 molar HNO₃ 2.44 mg./ml Pu-238 | 0.974 molar HNO₃ 2.40 mg./ml Pu-238 | 56 | 39 | 0.1521 |
| 0.186 molar HNO₃ 2.48 mg./ml Pu-238 | 0.828 molar HNO₃ 2.41 mg./ml Pu-238 | 35 | 25 | 0.0625 |

Comparison of Table 2 with Table 1 indicates that the available power and voltage under load may be greater for a cell using the liquid junction than for a cell using a salt bridge, which may be due to a decrease in the battery's internal resistance.

Other arrangements and modifications may be made to the self regenerating storage battery shown in FIG. 1 to improve its efficiency, minimize its physical size or weight, and to increase its output. For instance, the anodic and cathodic cells may occupy different container portions of a single enclosure, with a suitable partition allowing ion migration between these containers. A multiplicity of cells may be connected in parallel or series to increase voltage or current output, and other modifications may be made which are known in the art for improving electrochemical cells and batteries.

The invention provides a self regenerating storage battery which may be used as a power source on an intermittent basis at remote and inaccessible locations. The peculiar phenomena of plutonium ions in acid solution tending toward a predictable ion valence distribution facilitates the battery recharging itself. Furthermore, plutonium-238, which has a half life of 86 years, may provide a self regenerating battery which will last for an extended period of time.

It will be understood that various other changes in the details, materials and arrangements of the parts, which have been herein described and illustrated, may be made by those skilled in the art within the scope of the invention expressed in the claims.

What is claimed is:

1. A self regenerating battery comprising a first container, a cathode disposed in said first container, a first electrolyte means containing radioactive plutonium ions and an acid selected from the group consisting of nitric acid and hydrochloric acid at a concentration of about one mole per liter in said first container contacting said cathode for providing a high concentration of plus four valence species of radioactive plutonium ions for reduction at said cathode during battery discharge, a second container, an anode disposed in said second container, a second electrolyte means containing radioactive plutonium ions and an acid selected from the group consisting of nitric acid and hydrochloric acid at a concentration less than about two tenths mole per liter in said second container contacting said anode for providing a high concentration of plus three valence species of radioactive plutonium ions for oxidation at said anode during battery discharge, and means for providing ion migration between said first and said second electrolyte means for facilitating a potential difference between said cathode and said anode, any reduced and oxidized radioactive plutonium ions returning to their original valence state during battery recharge.

2. The battery of claim 1 wherein said plutonium ions comprise plutonium-238.

3. The battery of claim 1 wherein said acid of said electrolyte means comprises nitric acid.

4. The battery of claim 1 wherein said cathode and anode comprise platinum foil.

5. The battery of claim 1 wherein the means for providing ion migration comprises a direct liquid to liquid junction between said first and said second electrolyte means.

References Cited

UNITED STATES PATENTS

| | | | |
|---|---|---|---|
| 3,113,047 | 12/1963 | Lasser et al. | 136—6 |
| 3,200,269 | 8/1965 | Goldstein et al. | 310—3 |
| 3,255,044 | 6/1966 | Powers et al. | 136—86 |

WINSTON A. DOUGLAS, Primary Examiner

C. F. LEFEVOUR, Assistant Examiner

U.S. Cl. X.R.

136—83